United States Patent Office 3,658,764
Patented Apr. 25, 1972

---

3,658,764
CROSS-LINKED RESINS
Michel Bargain, Lyon, Andre Combet, La Mulatiere, and Pierre Grosjean, Sainte-Foye-les-Lyon, France, assignors to Rhone-Poulenc S.A., Paris, France
No Drawing. Continuation-in-part of application Ser. No. 743,025, July 8, 1968. This application Oct. 13, 1970, Ser. No. 80,455
Claims priority, application France, July 13, 1967, 114,381
Int. Cl. C08g 20/00
U.S. Cl. 260—78 UA    4 Claims

ABSTRACT OF THE DISCLOSURE

Cross-linked resins of good thermal stability useful inter alia for making multicellular materials, for bonding metals, and for making laminates and moulded articles are made by reacting, e.g. by heating together, an unsaturated bis-imide with a diprimary diamine in a ratio of 1.2:1 to 50:1.

---

This application is a continuation-in-part of our application Ser. No. 743,025 filed July 8, 1968, now Pat. No. 3,562,223.

This invention relates to cross-linked resins of good thermal stability and their production.

French Pat. No. 1,455,514 describes three-dimensional polyimides prepared by heating N,N'-bis-imides of unsaturated carboxylic acids, e.g. maleic N,N'-metaphenylene-bis-imide. These polyimides are infusible and insoluble resins whose decomposition temperature is high, but moulded objects made of them often undergo deformations on the surface in the course of prolonged use at temperatures in the neighborhood of 200° C. or above.

It has also been proposed (see U.S. Pat. No. 2,818,405) to prepare linear elastomers by coupling liquid diprimary diamines having an optionally halogenated aliphatic chain and a molecular weight from 750 to 12,000, with a bis-maleimide. These elastomers may be converted into elastic films or filaments, but are obviously less well adapted to the production of compact moulded articles, while in addition they have low thermal stability.

It has now been found, and this forms the subject of the present invention, that new cross-linked resins resistant to severe thermal stresses are obtained when an N,N'-bis-imide of an unsaturated dicarboxylic acid of the formula:

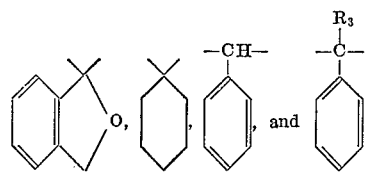

in which D represents a divalent radical containing a carbon-carbon double bond and A is a divalent radical having at least 2 carbon atoms, is reacted with a diamine of the formula:

$$H_2N—B—NH_2 \quad (II)$$

in which B represents a divalent radical not having more than 30 carbon atoms, in a ratio of bis-imide to diamine of between 1.2:1 and 50:1.

The symbols A and B may be identical or different and may represent linear or branched alkylene radicals having less than 13 carbon atoms, cycloalkylene radicals having 5 or 6 carbon atoms in the ring, heterocyclic radicals containing at least one of the atoms O, N and S, or a phenylene or polycyclic aromatic radical. These various radicals may carry substituents which do not give undesired side-reactions under the operating conditions. The symbols A and B may also represent a number of phenylene or alicyclic radicals connected directly or by a divalent atom or group such as, for example, oxygen or sulphur, an alkylene grouping of 1 to 3 carbon atoms, or one of the groups $—NR_4—$, $—P(O)R_3—$, $—N=N—$

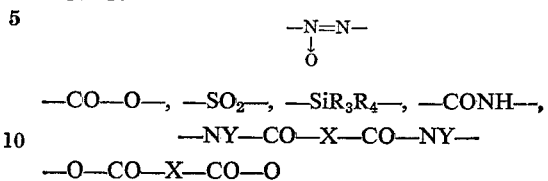

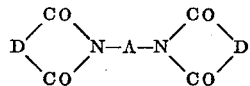

in which $R_3$, $R_4$ and Y each represent alkyl of 1 to 4 carbon atoms, or a cycloalkyl radical having 5 or 6 carbon atoms in the ring, or a phenyl or polycyclic aromatic radical, and X represents a straight or branched alkylene radical having less than 13 carbon atoms, a cycloalkylene radical having 5 or 6 carbon atoms in the ring, or a mono— or polycyclic arylene radical.

The radical D is derived from an ethylenic anhydride of the formula:

which may be, for example, maleic anhydride, citraconic anhydride, tetrahydrophthalic anhydride, itaconic anhydride and the products of Diels-Alder reaction between a cyclodiene and one of these anhydrides.

Preferred N,N'-bis-imides of Formula I which may be employed, are maleic N,N'-ethylene-bis-imide,
maleic N,N'-hexamethylene-bis-imide,
maleic N,N'-metaphenylene-bis-imide,
maleic N,N'-paraphenylene-bis-imide,
maleic N,N'-diphenylmethane-bis-imide,
maleic N,N'-4,4'-diphenylether-bis-imide,
maleic N,N'-4,4'-diphenylsulphone-bis-imide,
maleic N,N'-4,4'-dicyclohexylmethane-bis-imide,
maleic N,N'-α,α'-4,4'-dimethylenecyclohexane-bis-imide
maleic N,N'-metaxylylene-bis-imide,
maleic N,N'-4,4'-diphenylcyclohexane-bis-imide,
maleic N,N'-4,4'-(2,2-diphenylpropane)-bis-imide, and
maleic N,N'-4,4'-triphenylmethane-bis-imide.

Examples of diamines of Formula II which may be employed, are 4,4'-diaminodicyclohexylmethane,
1,4-diaminocyclohexane,
2,6-diaminopyridine,
metaphenylenediamine,
paraphenylenediamine,
4,4'-diaminodiphenylmethane,
2,2-bis-(4-aminophenyl)propane,
benzidine,
4,4'-diaminophenyl oxide,
4,4'-diaminodiphenyl sulphide,
4,4'-diaminodiphenylsulphone,
bis-(4-aminophenyl)diphenylsilane,
bis-(4-aminophenyl)methylphosphine oxide,
bis-(3-aminophenyl)methylphosphine oxide,
bis-(4-aminophenyl)phenylphosphine oxide,
bis-(4-aminophenyl)phenylamine, 1,5-diaminonaphthalene,
metaxylylenediamine,
paraxylylene diamine,
1,1-bis-(paraaminophenyl)phthalane,
1,1-bis-(4-aminophenyl)cyclohexane,
1,1-bis(4-amino-3-methylphenyl)cyclohexane,
hexamethylenediamine,
4,4'-diaminoazobenzene,
4,4'-diaminotriphenylmethane,
4,4'-diaminophenyl benzoate,
1,4-bis-(paraaminophenoxycarbonyl)benzene,
1,4-bis-(para-aminophenoxy)benzene, and
N,N'-bis-(para-aminobenzoyl)-4,4'-diaminodiphenylmethane.

The quantities of N,N'-bis-imide and of diamine are chosen in such manner that the ratio $$\frac{\text{number of moles of N,N'-bis-imide}}{\text{number of moles of diamine}}$$

is between 1.2:1 and 50:1, preferably between 1.3:1 and 5:1.

The preparation of the new resins of the invention may be carried out in an inert polar diluent such as dimethylformamide, N-methylpyrrolidone or dimethylacetamide. A solvent is advantageously used when the application of the polymer formed necessitates the use of a solution, because it makes it possible to obtain directly solutions whose solids content may be very high.

The preparation may also be carried out in bulk, by heating the reactants which have previously been intimately mixed. Depending upon the physical state of the reactants, conventional methods may be employed for mixing finely divided solids, or a solution or a dispersion of one of the reactants in the other, maintained in the liquid state, may be prepared. For many uses, it is advantageous, first to heat the mixture of the two reactants at a moderate temperature of the order of 100° to 250° C. for a few minutes to a few hours. The prepolymer thus obtained may then be employed in solution in a solvent such as those referred to above or in suspension in an inert diluent, or it may be shaped by simple hot casting, or again it may be employed as powder. In a second phase, the hardening of the prepolymer may be directly effected by heating to temperatures of the order of 350° C., optionally under pressure.

The mixture may also be directly brought into the form of the desired article and the hardening may be effected by heating, optionally under pressure.

The new resins are infusible and insoluble. They have remarkable resistance to thermal stresses, have good dielectric properties and are endowed with excellent stability to chemical agents. They may be converted into multicellular materials or employed for bonding metals. They are also particularly useful for the preparation of laminates based on mineral fibres or of moulded articles optionally in association with fibrous or pulverulent fillers.

The following examples illustrate the invention. In these examples, the tests are carried out in accordance with the following standards:

Flexural test standard A.S.T.M. D790–63, the spans being specified in each example.

Tensile strength test: Standard A.S.T.M. D882–61 T.
Dielectric strength test: Standard A.S.T.M. D150–69 T.

EXAMPLE 1

2.148 g. of maleic N,N'-4,4'-diphenylmethane-bis-imide and 0.420 g. of 4,4'-diaminoazobenzene were intimately mixed and the mixture was heated to 200° C. for 1 hour. The object thus obtained was then subjected to a supplementary thermal treatment for 24 hours at 250° C., followed by 24 hours at 300° C. A homogeneous infusible resin was thus obtained, a sample of which was subjected after crushing to thermogravimetric analysis under nitrogen (rate of heating, 8° C. per minute). The loss in weight up to 400° C. was 1%.

EXAMPLE 2

The procedure of Example 1 was repeated replacing the specified diamine by 0.548 g. of bis-(4-aminophenyl) phenyl methane. Thermogravimetric analysis of the product showed that the loss in weight up to 400° C. was 3%.

EXAMPLE 3

The procedure of Example 1 was repeated replacing the specified diamine by 0.456 g. of 4,4'-diaminophenylbenzoate. A sample of the product was subjected to a supplementary thermal treatment for 24 hours at 200° C. Thermogravimetric analysis in the manner described in Example 1 showed a loss in weight of 2.5% up to 400° C. A second sample was subjected to a supplementary thermal treatment for 1 hour at 200° C., followed by 24 hours at 250° C., and finally by 24 hours at 300° C. Thermogravimetric analysis showed that the loss in weight up to 400° C. was 1%.

EXAMPLE 4

1.074 g. of maleic N,N' - 4,4' - diphenylmethane - bis-imide and 0.348 g. of 1,4-bis-(paraaminophenoxycarbonyl)benzene were intimately mixed and then heated to 200° C. for 1 hour. The object obtained was subjected to a supplementary thermal treatment for 24 hours at 200° C. Thermogravimetric analysis showed a loss in weight of 2% up to 400° C.

EXAMPLE 5

An intimate mixture of 2.315 g. of maleic N,N'-4,4'-(2,2-diphenylpropane)-bis-imide and 0.316 g. of 4,4'-diaminodiphenylmethane was heated to 200° C. for 1 hour. The object obtained was subjected to a supplementary thermal treatment for 24 hours at 250° C., followed by 24 hours at 300° C. A Thermogravimetric analysis of the product finally obtained showed a loss in weight of 2.5% up to 400° C.

EXAMPLE 6

A homogeneous mixture was prepared by grinding together 45.15 g. of maleic N,N'-4,4'-triphenylmethane-bis-imide and 9.9 g. of 4,4'-diaminodiphenylmethane. 30 g. of the mixture obtained were heated for 5 minutes at 200° C. After cooling and grinding, the prepolymer obtained was moulded at 200° C. for 1 hour under a pressure of 100 kg./cm.$^2$. The object obtained was removed hot from the mould and then subjected to a thermal treatment for 830 hours at 250° C. At the end of this treatment, the object still had a flexural strength of 8.6 kg./mm.$^2$.

EXAMPLE 7

An intimate mixture of 3.58 g. of maleic N,N'-4,4'-diphenylmethane-bis-imide and 0.976 g. of 1,4-bis-(para-aminophenoxy)benzene was heated to 200° C., for 4 minutes and then kept at 250° C. for 1 hour. A homogeneous resin was obtained which was then subjected to a supplementary thermal treatment at 250° C., for 24 hours followed by 300° C., for 20 hours. An infusible resin was obtained. A sample was subjected to thermogravimetric analysis under nitrogen (rate of heating, 8° C., per minute). The loss in weight up to 400° C., was 1.5%.

EXAMPLE 8

The procedure described in Example 7 was repeated replacing the specified diamine by 1.42 g. of N,N'-bis-(paraaminobenzoyl) - 4,4' - diaminodiphenylmethane. A thermogravimetric analysis on a sample of the resin obtained showed a loss in weight of 3% up to 400° C.

We claim:
1. A crosslinked resin obtained by heating at 100° C., to 350° C., an unsaturated bis-imide selected from the group consisting of maleic N,N'-4,4'-(2,2-diphenylpro- pane)-bis-imide and maleic N,N'-4,4'-triphenylmethane-bis-imide with a diamine selected from the group consisting of 4,4'-diaminodicyclohexylmethane,
1,4-diaminocyclohexane,
2,6-diaminopyridine,
metaphenylenediamine,
paraphenylenediamine,
4,4'-diaminodiphenylmethane,
2,2-bis-(4-aminophenyl)-propane,
benzidine,
4,4'-diaminophenyl oxide,
4,4'-diaminodiphenyl sulphide,
4,4'-diaminodiphenyl-sulphone,
bis-(4-aminophenyl)diphenylsilane,
bis-(4-aminophenyl)methylphosphine oxide,
bis-(3-aminophenyl)methylphosphine oxide,
bis-(4-aminophenyl)phenylphosphine oxide,
bis-(4-aminophenyl)phenylamine,
1,5-diamino-naphthalene,
metaxylylenediamine,
paraxylene diamine,
1,1-bis(paraaminophenyl)phthalane,
1,1-bis(4-aminophenyl)cyclohexane,
1,1-bis(4-amino-3-methylphenyl)cyclohexane, and
hexamethylene-diamine at a ratio of bis-imide to diamine of from 1.2:1 to 50:1.

2. A crosslinked resin obtained by heating at 100° C., to 350° C., an unsaturated bis-imide selected from the group consisting of maleic N,N'-ethylene-bis-imide,
maleic N,N'-hexamethylene-bis-imide,
maleic N,N'-metaphenylene-bis-imide,
maleic N,N'-paraphenylene-bis-imide,
maleic N,N'-4,4'-diphenylmethane-bis-imide,
maleic N,N'-4,4'-diphenylether-bis-imide,
maleic N,N'-4,4'-diphenylsulphone-bis-imide,
maleic N,N'-4,4'-dicyclohexylmethane-bis-imide,
maleic N,N' - α,α'-4,4'-dimethylenecyclohexane-bis-imide,
maleic N,N'-metaxylylene-bis-imide,
maleic N,N'-4,4'-diphenylcyclohexane-bis-imide,
maleic N,N'-4,4'-(2,2-diphenylpropane)bis-imide, and
maleic N,N'-4,4'-triphenylmethane-bis-imide with a diamine selected from the group consisting of 4,4'-diaminoazobenzene,
4,4'-diaminotriphenylmethane,
4,4'-diaminophenyl benzoate,
1,4-bis(paraaminophenoxycarbonyl)benzene,
1,4-bis(paraaminophenoxy)benzene, and
N,N'-bis(paraaminobenzoyl)-4,4'-diaminodiphenylmethane at a ratio of bis-imide to diamine of from 1.2:1 to 50:1.

3. The crosslinked resin of claim 1 wherein the ratio of bis-imide to diamine is from 1.3:1 to 5:1.

4. The crosslinked resin of claim 2 wherein the ratio of bis-imide to diamine is from 1.3:1 to 5:1.

References Cited

UNITED STATES PATENTS

| | | | |
|---|---|---|---|
| 2,818,405 | 12/1957 | Kovacic | 260—78 |
| 3,380,964 | 4/1968 | Grundschober et al. | 260—47 |
| 3,562,223 | 2/1971 | Bargain et al. | 260—78 |

FOREIGN PATENTS

| | | | |
|---|---|---|---|
| 1,555,564 | 1/1969 | France | 260—47 CZP |

WILLIAM H. SHORT, Primary Examiner

L. L. LEE, Assistant Examiner

U.S. Cl. X.R.

161—197, 227; 760—47 CZ